Sept. 20, 1971  E. W. MORAIN ETAL  3,606,565
SELF-PUNCHING T FITTING

Filed June 26, 1969  2 Sheets-Sheet 1

INVENTOR.
ELDON W. MORAIN
JERRY W. RIGGS
BY
Head & Johnson
ATTORNEYS

INVENTOR.
ELDON W. MORAIN
JERRY W. RIGGS
BY
Head & Johnson

United States Patent Office 3,606,565
Patented Sept. 20, 1971

3,606,565
SELF-PUNCHING T FITTING
Eldon W. Morain and Jerry W. Riggs, Tulsa, Okla., assignors to Continental Industries, Inc., Tulsa, Okla.
Filed June 26, 1969, Ser. No. 836,927
Int. Cl. B23b 41/08, 51/04
U.S. Cl. 408—204
6 Claims

ABSTRACT OF THE DISCLOSURE

This invention relates to a self-punching T fitting. More particularly, the invention relates to an improved punch face configuration for a punch member as utilized in a self-punching T fitting, the punching member serving to punch a hole in a pipe, such as a gas main, by rotation axial advancement of the punch against the pipe, the improved punch face serving to penetrate the pipe to which the self-punching T fitting is attached and to augment the grasping of the coupon punched out of the pipe so that the coupon is retained and retracted rather than being deposited into the interior of pipe.

CROSS REFERENCE

This disclosure is not related to any pending United States or foreign patent applications.

BACKGROUND AND OBJECTS OF THE INVENTION

The use of self-punching T fittings as a means of providing communication with the interior of a pipe, such as a gas main, is well known in the art. For a background, history and discussion of such self-puncting T fittings reference may be had to U.S. Pat. Nos. 3,142,205; 3,247,-862; 3,264,907; 3,295,398; 3,411,527; Re. 26,224; and others. Generally, a self-punching T fitting is a device providing means of obtaining a branch outlet from a gas main without the necessity of closing the gas main while the connection is being made and without the escape of any gas from the main in the process of making the branch outlet connection. Typically, a self-punching T fitting includes a T element having a lower end adapted to be welded to the gas main. The interior of the T fitting is threaded and into the T fitting is threadably positioned a punch member. The punch is cylindrical having threads on at least a portion of the cylindrical exterior surface and having an upper tool receiving recess. The lower end of the punch is usually of reduced diameter and terminates in a lower punch end face configuration. Intermediate the length of the tubular body is a branch portion, the interior of which communicates with the interior of the tubular body.

After the lower end of the tubular body is welded onto a pipe the punch member is threadably inserted into the tubular element and by means of a tool element the punch member is rotatably axially advanced. The lower punch face engages the pipe and by force imparted by the threads, coupled with the rotation against the gas main, a hole is forced into the gas main. After the hole is formed a rotation of the punch in the opposite direction axially retards it into the upper end of the tubular body and provides free communication between the branch outlet and the interior of the gas main through the hole which has been formed therein.

Earlier types of self-punching T fittings provided a form of coupon which either hinged to the interior of the gas main or which came loose and deposited into the main. These coupons are a source of potential trouble since they may be moved along by the flow of gas and eventually plug openings, cause gas regulators to stick open, or so forth. Therefore, an improved procedure includes means provided for grasping the coupons by the punch member so that the coupon is retained by the punch and withdrawn when the punch is withdrawn. In this way no coupon is deposited into the interior of the gas main to cause trouble.

This invention provides an improved configuration for the punching face of the punch member of a self-punching T fitting. More specifically, the invention provides an improved configuration for the punching face of a punch having means to insure the retention of the coupon formed by the punch in the gas main and thereby prevent the coupon from being deposited to the interior of the main.

It is therefore an object of this invention to provide an improved punch for a self-punching T fitting.

More particularly, an object of this invention is to provide a punch having an improved punch face configuration which causes the punch to grasp the coupon formed by the punch when forced through a gas main to prevent the deposit in the gas main of the coupon.

These general objects, as well as more specific objects of the invention will be understood from the following description and claims, taken in conjunction with the drawings.

DESCRIPTION OF THE VIEWS

DETAILED DESCRIPTION

Figure 1:
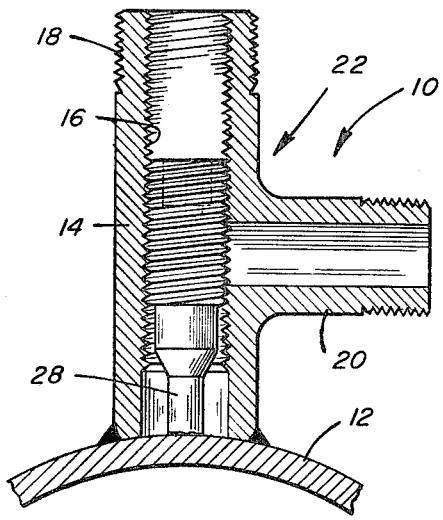
FIG. 1 is a cross-sectional view of a self-punching T fitting, including the improved punch of this invention, the T fitting being affixed to the exterior surface of a gas main preparatory to punching a hole in the gas main.

Referring now to the drawings, and first to FIG. 1, a self-punching T fitting 10 is shown welded to the exterior surface of a conduit or pipe 12. In normal application self-punching T fittings are utilized as means of providing a branch outlet for a gas main or conduit 12. The T fitting includes an upstanding tubular body portion 14 which is internally threaded 16. The lower end of the body portion 14 is welded to the conduit 12 and the upper end is opened and is provided with means, such as external threads 18, for receiving a cap whereby the upper end of the body portion may be closed after the T fitting has been installed in conduit 12 and a branch connection provided.

Intermediate the length of the tubular body portion 14 is an integral branch portion 20 which provides means for connecting a branch line.

Figure 2:
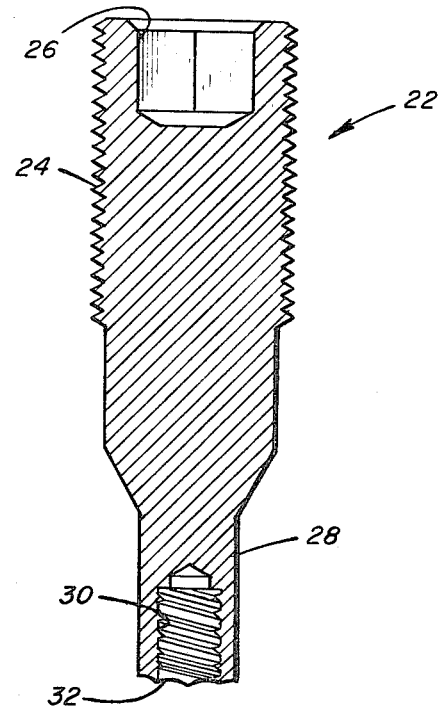
FIG. 2 is an enlarged cross-sectional view of the punch for use in the self-punching T fitting.

Positioned within the body portion 14 is a punch portion generally indicated by the numeral 22, the punch portion being shown in enlarged dimensions in FIG. 2.

Punch 22 is in the form of an elongated cylindrical member having external threads 24 thereon which threadably engage internal threads 16 of the T fitting tubular body portion 14. The upper end of the cylindrical punch 22 includes a tool receiving recess 26. The lower end of the punch 22 is provided with a reduced diameter portion 28 having a lower axial recess 30 therein.

The self-punching T fitting 10, including the punch 22, described to this point is generally known in the prior art and the function and uses thereof are well known. This invention concerns the configuration of the cylindrical lower punching face 32 of punch 22.

Figure 1A:
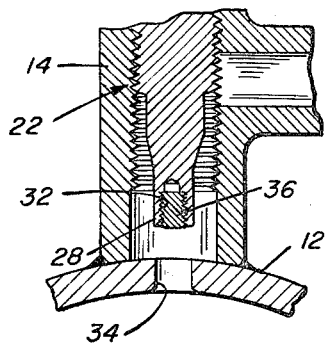
FIG. 1A is a fragmentary cross-sectional view of the lower end of a self-punching T fitting as shown in FIG. 1 and showing the hole having been punched in the gas main and the punch member partially withdrawn, the lower punching portion of the punch member being shown in cross section and showing the coupon retained by the punch.

FIG. 1A shows the self-punching T fitting as in FIG. 1 but showing the relationship of components after a hole 34 has been punched in the conduit 12 and the punch 22 has been rotatably withdrawn upwardly within the tubular body 14. As shown in FIG. 1, retained in the axial recess 32 is a coupon 36 which has been removed from conduit 12 in the process of forming hole 34 by the rotational axial threaded advancement of the punch 22 downwardly against and through the conduit 12. Further upward rotational withdrawing of punch 22 into the upper end of tubular body 14 provides free fluid flow between conduit 12 and branch outlet 20 through hole 34.

Figure 3:
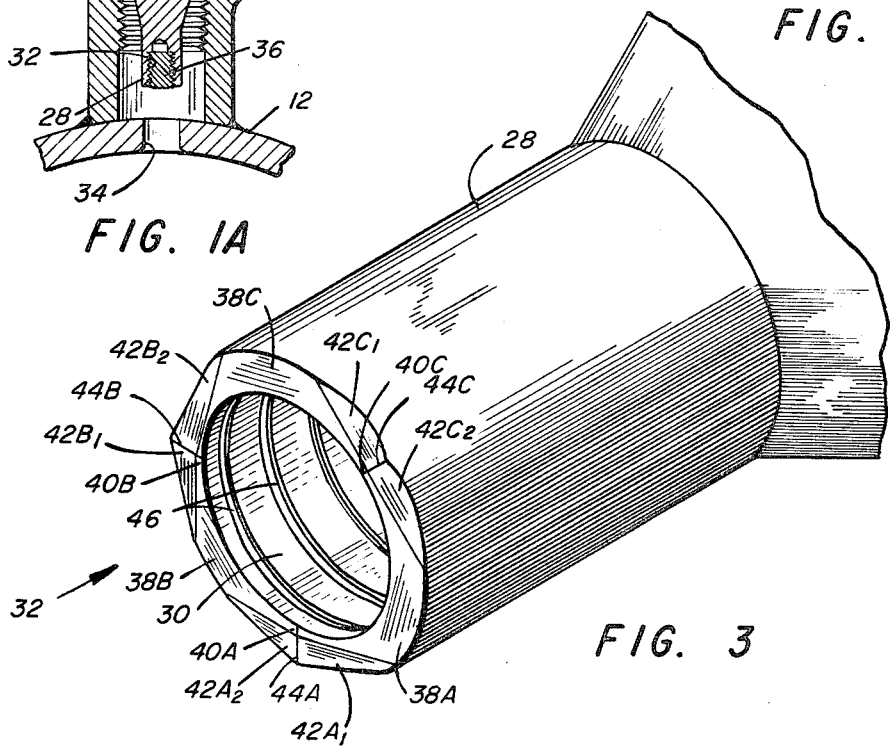
FIG. 3 is a highly enlarged isometric view of one embodiment of the improved punch face configuration of this invention.

Referring now to FIG. 3, the improved punching face 32 of the invention is best shown. The punching face 32 is defined by three intersecting primary planes 38A, 38B and 38C. Each of these primary planes is at an angle relative to a plane drawn perpendicular the longitudinal axis of the tubular punch 22 of between 10° and 25°, with an angle of 15° being preferred.

The three planes, 38A, 38B, and 38C, intersect the tubular punch portion 28 to provide three primary radial apices 40A, 40B and 40C. Specifically, planes 38A and 38B intersect to provide apex 40A; planes 38B and 38C intersect to provide apex 40B; and planes 38C and 38A intersect to provide apex 40C. Each of the apices 40A, 450B and 40C is radial from the punch longitudinal axis and has an angle of from 4° to 10° relative to a plane perpendicular the punch longitudinal axis with an angle of 6° being preferred. The angle of apices 40A, 40B and 40C is dependent upon the angle of primary planes 38A, 38B and 38C. With the angle of planes 38A, 38B and 38C being 15° the apieces 40A, 40B and 40C are approximately 6°.

Further defining the punch end face 32 of FIG. 3 are three pairs of secondary planes designated as 42A₁, 42A₂, 42B₁, 42B₂, 42C₁ and 42C₂. Each of the secondary planes has an angle of between 30° and 60° relative to a plane perpendicular the longitudinal axis of the punch member, with an angle of 45° being preferred.

The intersection of each pair of secondary planes provides secondary apices 44A, 44B and 44C. The secondary apices are radial and in the same plane as the primary apices. The angle of secondary apices 44 is controlled by the angle of secondary planes 42 and preferably is between 30° and 60°, with an angle of 45° being preferred.

Thus the end face 32 of FIG. 3 may be said to be defined by grinding nine planes onto the surface.

The improved punching end face 32 of FIG. 3 performs to cut, punch, or swedge a hole in a pipe in a means such that the hole once formed is sufficiently large so that the coupon produced in the process of forming the hole is grasped by the punch and freely withdrawn back through the hole when the direction of rotation of the punch is reversed.

In order to assist in positively grasping the coupon 36 formed by the punch of FIG. 3, a preferred embodiment includes the provision of threads 46 in the axial recess 30. The threads 46 form a threaded groove about the exterior of the coupon 36 to insure that the coupon is firmly held within the tubular recess 32 when the punch is withdrawn to thereby prevent the coupon from being inadvertently deposited in the interior of the conduit.

ALTERNATE EMBODIMENTS

Figure 4:
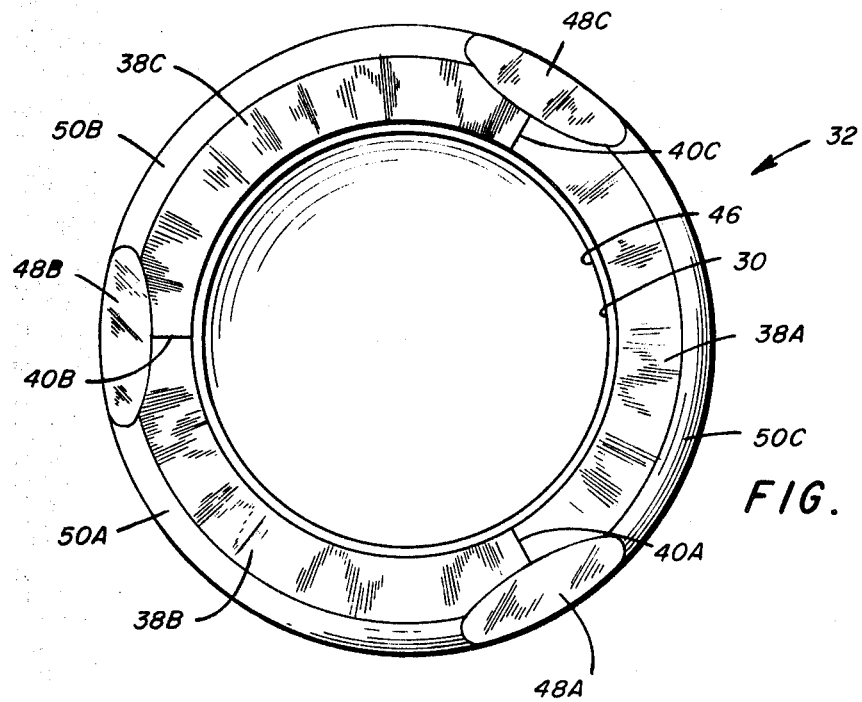
FIG. 4 is an end view of an alternate embodiment of the punch face configuration of this invention.
Figures 5, 6:
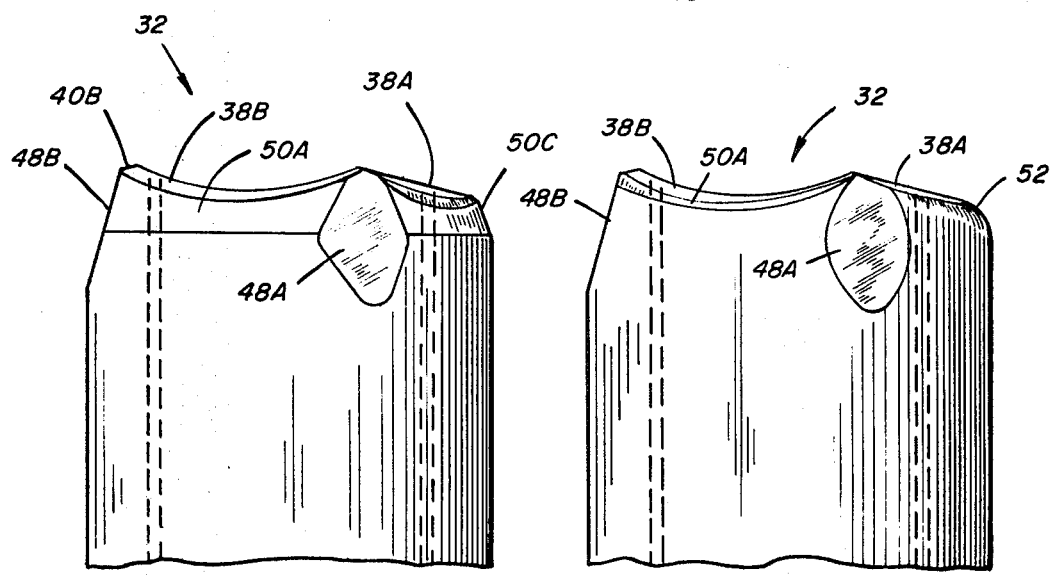
FIG. 5 is a view of the punching face of the alternate embodiment of FIG. 4.
FIG. 6 is a side view of a punch of this invention as shown in FIG. 5 but showing still an additional alternate embodiment of the invention.

Referring to FIGS. 4 and 5 an alternate embodiment of the invention is shown. In this embodiment primary planes 38A, 38B and 38C are provided as previously described which intersect to provide radial apices 40A, 40B and 40C. In this embodiment there is provided a secondary plane at each of the apices, the secondary planes being identified by the numerals 48A, 48B and 48C. Each of the secondary planes has an angle, relative to a plane perpendicular to the punch axis, of between 65° and 80° with an angle of 75° being preferred. The punching face 32 is further defined, in the embodiment of FIGS. 4 and 5, by a beveled surface at the tubular periphery of the punch face, the beveled surfaces extending between secondary planes 48A and 48B and 48C, and being designated by the numerals 50A, 50B and 50C. The beveled surfaces 50A, 50B, and 50C each have an angle of between 60° and 70° relative to a plane perpendicular to the tubular axis, with an angle of 75° being preferred.

The embodiment of FIGS. 4 and 5 have the advantages of the embodiment previously described relative to FIG. 3. It is noted that the embodiment of FIGS. 4 and 5 is different from the arrangement of FIG. 3 in that only six planar surfaces are ground into the tubular punch end with the additional beveled surfaces 50A, 50B and 50C being ground on the periphery of the punch face.

FIG. 6 shows an additional alternate embodiment, the same being an alternate embodiment of the arrangement of FIGS. 4 and 5. In the embodiment of FIG. 6 the end view of the punch face would be substantially the same as shown in FIG. 4. The only difference in the embodiment of FIG. 6 is that the beveled surface of FIGS. 4 and 5 is replaced by a milled radius 52. The milled radius 52 preferably has a dimension of between $\frac{1}{64}$ inch and $\frac{1}{32}$ inch.

The invention illustrated, including the embodiments of FIG. 3, the embodiment of FIGS. 4 and 5, and the embodiments of FIG. 6, include the arrangement wherein three primary radial apices are provided. It can be seen that the invention can be practiced wherein three or more such radial apices are provided to correspond with an increase in the number of primary and secondary planes. While such would be within the purview of this invention the illustrated embodiment providing three primary radial apices is highly preferred, not only because of the economy of manufacture, but because such embodiment produces, for most sizes of punches, greatest punching effectiveness.

In the embodiments of FIGS. 4, 5 and 6 the internal threads 46 may be provided as illustrated in FIG. 3 to augment the grasping of the coupon to insure its withdrawal as the direction of rotation of the punch is made following the punching of the hole in the conduit to which the self-punching T fitting is attached.

While the invention has been described with a certain degree of particularity it is manifest that many changes may be made in the details of construction and the arrangement of components without departing from the spirit and scope of this disclosure.

What is claimed is:

1. For use in a self-punching T fitting:
an elongated cylindrical punch having external threads and a tool receiving recess in the top end, the lower portion being of a reduced diameter and having an axial recess therein forming a cylindrical lower punching face, said punching face being further defined by at least three intersecting primary planes each at an angle of between 10° and 25° relative to a plane perpendicular to the punch axis and defining apieces therebetween, and said punching face being further defined by a secondary plane at each of said apices having an angle of between 65° and 80° relative to a plane perpendicular the punch axis, said secondary planes reducing the radial length of said apices, and said punching face being further defined by beveled surfaces at the tubular periphery of the punch lower portion intermediate each of said secondary planes.

2. A punch according to claim 1 wherein said axial recess has internal threads therein.

3. A punch according to claim 1 wherein said beveled surfaces at the tubular periphery of the punch lower portion intermediate each of said secondary planes is in the form of a milled radius of a radius dimension of between 1/64 inch and 1/32 inch.

4. A punch according to claim 3 wherein said axial recess has internal threads therein.

5. A punch according to claim 1 wherein said beveled surfaces at the tubular periphery of the punch lower portion intermediate each of said secondary planes is in the form of a beveled surface being at a angle of between 60° to 70° relative to a plane perpendicular to the punch axis.

6. A punch according to claim 5 wherein said axial recess has internal threads therein.

References Cited
UNITED STATES PATENTS 3,295,398   1/1967   Morain _____ 77—42

FRANCIS S. HUSAR, Primary Examiner

U.S. Cl. X.R.

137—318; 408—204